Dec. 11, 1962 R. E. STILWELL 3,068,025
PIPE COUPLING
Original Filed Nov. 22, 1954
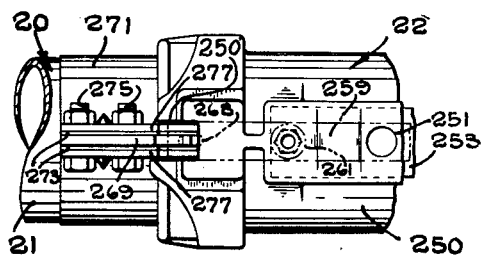
FIG_2
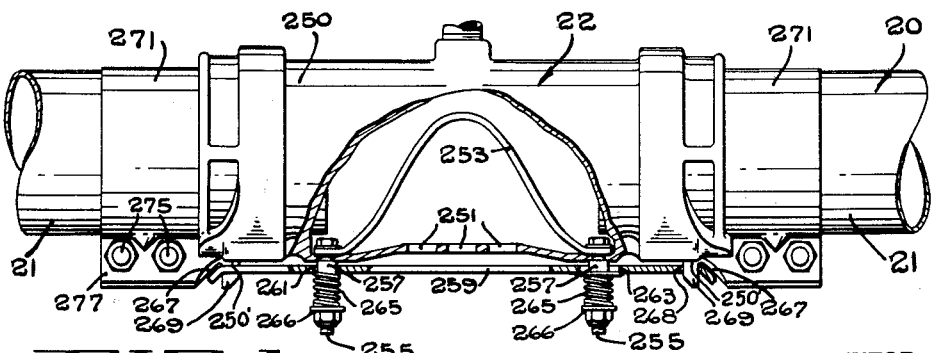
FIG_1
INVENTOR
ROBERT E. STILWELL
BY *Hans G. Hoffmeister*
ATTORNEY

United States Patent Office 3,068,025
Patented Dec. 11, 1962

3,068,025
PIPE COUPLING
Robert E. Stilwell, Santa Clara, Calif., assignor to FMC Corporation, a corporation of Delaware
Original application Nov. 22, 1954, Ser. No. 470,494, now Patent No. 2,892,466, dated June 30, 1959. Divided and this application May 11, 1959, Ser. No. 812,473
3 Claims. (Cl. 285—5)

The present invention relates to wheeled, portable, irrigation systems, and more particularly concerns an improved coupling for joining sections of irrigation piping.

One object of the present invention is to provide an improved pipe coupling for a portable irrigation system.

Another object is to provide an improved coupler for connecting the pipes of a wheeled, portable, irrigation system, the coupler being automatically self latching upon insertion of the pipes.

These and other objects and advantages of the present invention will become apparent from the following description and accompanying drawings in which:

FIGURE 1 is an elevation of the pipe coupling of the present invention, certain parts thereof being broken away.

FIGURE 2 is a fragmentary bottom plan view of a portion of the pipe coupling illustrated in FIGURE 1.

The present application is a division of application Ser. No. 470,494 filed November 22, 1954, now Patent Number 2,892,466.

The portable irrigation system in which the pipe coupler of the present invention is incorporated comprises a portable irrigation pipe line 20 (FIG. 1) including a plurality of light weight pipes 21 positioned in longitudinal alignment and connected by pipe couplings 22 (only one of which is shown) having irrigation sprinklers, not shown, attached thereto. The couplings 22 are so constructed and arranged that substantially no relative rotation or longitudinal movement between the pipes and the couplings can take place, thereby obtaining a substantially rigid pipe line.

The pipe couplings 22 of the present invention for connecting the pipes 21 of the pipe line 20 each comprises an elongated, generally cylindrical intermediate, female collar 250 open at both ends, having notches 250' opening endwardly of said collar, and having a plurality of drain holes 251 in its lower portion. A flexible, resilient, rubber drain valve 253, such as disclosed in the U.S. patent of Robert E. Stilwell, Patent No. 2,768,639, dated October 30, 1956, is operatively associated with the holes 251 and is secured adjacent its ends to the interior of the collar 250 at either side of the drain holes 251 by machine bolts or slide members 255 which mount spacer sleeves 257. A latch retaining bar or plate 259, having intermediate and opposite end portions, is mounted on the sleeves 257 for sliding movement radially of the collar 250, while an aperture 261 and a slot 263 are provided in the bar 259 to permit this mounting. The bar 259 is normally held in a raised position directly beneath the drain holes 251 in the bottom portion of the collar 250 by springs 265 mounted on the sleeves 257 below said bar and held on the sleeves by washer and nut assemblies 266. Each end portion of the bar 259 is curved downwardly to form a camming surface 267 and in the intermediate portion of the bar, near each end thereof, there is provided a narrow slot or opening 268 adapted to receive a hook-shaped latch, or latch plate 269, one of which is secured in a radially extending plane to the end of each pipe 21. The latches 269 are secured to the pipes 21 by means of split male pipe collars 271 having generally radially extending tabs 273 between which said hook-shaped latches 269 are clamped by cooperating bolts 275 and spacer bars 277.

The manner of connecting the pipes 21 by means of the couplings 22 is exceedingly simple and may be accomplished very quickly. The pipes 21 with the hook-shaped latches 269 attached thereto, as above described, are aligned with the open ends of the collar 250, the latches 269 being aligned with the retaining bar 259 and with the notches 250'. The pipes are then thrust into the collar 250 whereupon the hook-shaped latches 269 contact the retaining bar camming surfaces 267 thereby depressing the bar against the urge of the springs 265, and the latches slide into the notches. Upon further movement of the pipes into the collar 250 the latches 269 ride over the surfaces 267 and into alignment with the latch retaining slots 268, whereupon the springs 265 return the bar 259 to a raised position thereby securely retaining radial fingers of the latches 269 in the slots 268. In this manner the pipes 21 are not only held against movement longitudinally of each other but are also held against relative rotation by the engagement of the hook-shaped latches 269 with the sides of the slots 268. Disengagement of the pipes 21 from the collar 250 is readily accomplished by depressing the bar 259 to release the latches from engagement with the slots 268 and then withdrawing the pipes from the collar.

As water flows into the pipe line, the drain valve 253 in the coupler 22 is automatically forced down into sealing relation with the drain holes 251, thus closing the same and causing the pressure in the pipe line to build up and the sprinkler to operate. When the area adjacent the initial irrigating location of the pipe line 20 has been sufficiently irrigated, the water supply to the pipe line 20 is interrupted, thus reducing the pressure in the pipe line and permitting the resilient rubber drain valve 253 to return to its open position, whereupon the water remaining in the pipe line is drained therefrom through the holes 251. Since the retaining bar 259 is positioned directly beneath the drain holes 251 water draining from the pipes strikes the bar 259 and is diffused, thereby preventing the erosion of the ground beneath the holes 251.

While an exemplary embodiment of the present invention has been described, it will be understood that various changes and modifications may be made in the details thereof without departing from the spirit and scope of the appended claims.

Having thus described the invention, what I claim as new and desire to protect by Letters Patent is:

1. A pipe coupling comprising a female collar circumscribing a longitudinal axis therefor, a pair of bolts rigidly connected to the collar and spaced from each other longitudinally of the collar, said bolts projecting radially outwardly from said collar in a common direction and in substantially parallel relation to each other, a latch retaining bar having an intermediate portion slidably mounted on said bolts and extended longitudinally of said collar, said bar having opposite end portions projecting from said intermediate portion, one of the end portions of said bar projecting outwardly from said collar in oblique relation to said axis of said collar thereby providing a camming surface disposed toward said collar, said bar also having a slot adjacent to said outwardly projecting end portion, spring means on said bolts and engaging said bar for yieldably urging said bar toward said collar, a male collar adapted to be mounted in circumscribing relation on a pipe to-be-coupled and being releasably received in said female collar adjacent to said outwardly projecting end portion of said bar, and a latch rigidly connected to said male collar and projecting radially outwardly therefrom, said latch being releasably received in said slot with said male collar fitted in said female collar and being slidably engageable with said camming surface during movement of said male collar into said female collar thereby to urge said bar away from said female collar whereby entry of said latch into said slot is permitted.

2. A coupling comprising a first collar circumscribing a longitudinal axis therefor and having an end portion providing a notch opening endwardly thereof, a pair of bolts rigidly connected to said collar and spaced from each other longitudinally thereof, said bolts projecting radially outwardly from said collar in a common direction and in substantially parallel relation to each other, said bolts being substantially in a common plane with each other and with said notch and being on the same side of said collar as said notch, a latch retaining bar having an intermediate portion slidably mounted on said bolts and extended longitudinally of said collar, said bar having opposite end portions projecting from said intermediate portion with one of said end portions being opposite to said notch and in acute angular relation to said collar thereby providing a camming surface facing said collar, said bar having a slot in said intermediate portion adjacent to said camming surface, resilient means engaging said bar for yieldably urging said bar toward said collar, a second collar positioned coaxially of and endwardly adjacent to said first collar, and a latch rigidly connected to said second collar and having a finger projecting radially outwardly therefrom, said latch being releasably received in said notch with said finger fitted in said slot, said finger being slidably engageable with said camming surface during movement of said second collar toward said first collar and into said endwardly adjacent position thereby to urge said bar away from said first collar so that entry of said latch finger into said slot is permitted.

3. Apparatus for coupling two tubular pipe sections comprising an intermediate collar having opposite ends adapted to receive end portions of the two pipe sections to be joined, a split collar secured to each pipe end portion and being adjacent to opposite ends of said intermediate collar, each split collar having a pair of flanges projecting in a direction generally radially away from the pipe end portion associated therewith, a latch plate secured between each pair of said flanges having a radially projecting finger, elongated slide members radially outwardly extended from said intermediate collar in substantially parallel relation to each other and axially spaced from each other along said intermediate collar, a latch retaining bar slidably mounted on said slide members and having end portions projecting outwardly from said intermediate collar in acute angular relation thereto, said bar having openings inwardly adjacent to said end portions and individually releasably receiving the fingers of their respectively adjacent latch plates, said fingers being engageable with said end portions of said bar when said pipe sections are moved into said intermediate collar for urging said bar away from said intermediate collar to permit said fingers to enter their respective opening, and spring means encircling said slide members and engaging said bar for urging said bar inwardly to hold said fingers in said openings.

References Cited in the file of this patent

UNITED STATES PATENTS

| | | |
|---|---|---|
| 2,083,966 | Stitzer | June 15, 1937 |
| 2,702,717 | Cornelius | Feb. 22, 1955 |
| 2,758,609 | Dickert | Aug. 14, 1956 |
| 2,768,639 | Stilwell | Oct. 30, 1956 |

FOREIGN PATENTS

| | | |
|---|---|---|
| 501,365 | Italy | Nov. 24, 1954 |